April 18, 1944.   F. W. MEREDITH   2,346,857
FLUID ACTUATED SERVOMOTOR SYSTEM
Filed June 9, 1941
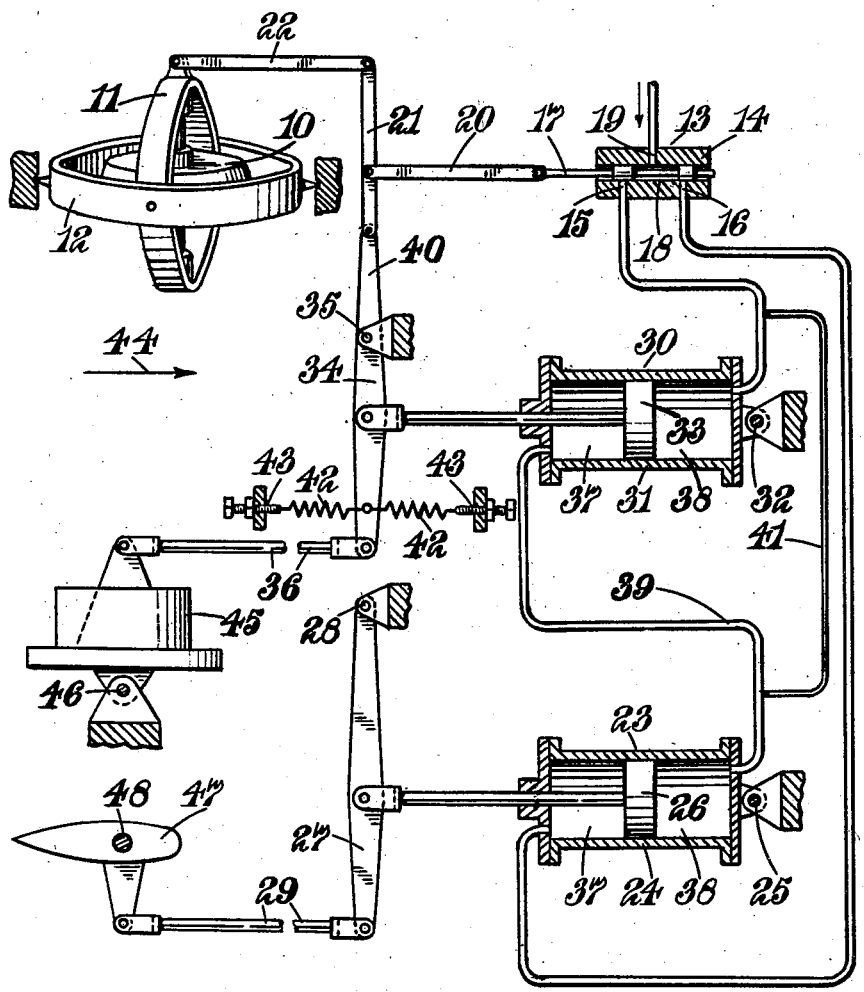
Frederick W. Meredith
By
Watson, Cole, Grindle & Watson
Attys.

Patented Apr. 18, 1944

2,346,857

UNITED STATES PATENT OFFICE 2,346,857

FLUID-ACTUATED SERVOMOTOR SYSTEM

Frederick William Meredith, London, England, assignor to S. Smith & Sons (Motor Accessories) Limited, London, England, a British company Application June 9, 1941, Serial No. 397,297
In Great Britain January 5, 1940

2 Claims. (Cl. 244—76)

This application corresponds to the application of S. Smith & Sons (Motor Accessories) Limited and Frederick William Meredith, Serial No. 342/40, which was filed in Great Britain on January 5, 1940.

This invention relates to fluid actuated servomotor systems employing a non-compressible fluid, i. e., a liquid. The invention is concerned with such systems of the kind employing a double acting motor having two chambers for liquid and a co-operating relatively movable member actuated in the opposed sense by the liquid pressure in the two chambers, a valve controller having two distribution ports with individual liquid connections to the chambers and a follow-up connection between the motor and the valve. By actuating the valve in one direction or the other from a mean position liquid is caused to flow to one chamber and from the other in order to actuate the motor in one or other direction depending upon the direction of actuation of the valve controller. An object of the present invention is to provide a simple liquid actuated system for exerting a control at a plurality of separate points.

According to the present invention there is provided a servomotor system of the kind specified comprising a second servomotor having its chambers connected one to the valve and the other to a chamber of the first motor and constituting the liquid connection between the latter chamber and the valve controller. The connections between the chambers of the second servomotor and the valve and first motor respectively may be direct permanent connections constituted by simple conduits. The valve controller may be of the well known simple form and comprising a tubular valve body having two distribution ports spaced apart lengthwise thereof and a valve member slidable in the valve body having a recess permanently in communication with either one or the other of the distribution ports by movement of the valve member. Thus, a valve controller of this simple form may be used to operate simultaneously two motors for exerting a control at different points, the valve controller being at any convenient position adjacent or not to one of the motors and the follow-up being required only between one of the motors and the valve controller.

Further according to the invention, there is provided a servomotor system of the kind referred to comprising a plurality of double acting motors connected in series with one another between the distribution ports of the valve controller by a single chain of conduits and a follow-up connection between only one of the motors and the valve controller.

In carrying out the invention it is preferable to provide a by-pass conduit having a restricted liquid passage connecting the chambers of the motor having the follow-up connection to the valve controller and spring means biasing the movable member of the motor to a mean position, so that the movable member of the motor, after being actuated, will eventually be returned to the mean position.

One application of the servomotor system according to the invention is to aircraft and the invention comprises the combination of means such as a gyroscope for detecting changes in the attitude of the craft about any axis, means for varying the attitude of the craft about this axis, a bomb sight adjustable for variations in the said attitude of the craft and a servomotor system as aforesaid in which the controller is operated by the detecting means and controls a motor actuating the attitude varying means and a second motor for adjusting the bomb sight.

In the accompanying drawing there is shown diagrammatically one application of a servomotor system according to the invention.

Referring to the drawing there is provided in an aircraft a gyroscope 10 with a vertical spinning axis mounted in gimbals 11 and 12 having axes coinciding respectively with the pitch and roll axes of the aircraft. The gyroscope is brought to the true vertical by gravitational means in the normal manner and not shown in the drawing. A valve controller 13 comprises a valve body 14 having distribution ports 15 and 16 and a valve member 17 slidable in the valve body and having a recess 18 permanently in communication with a common port 19 in the valve body. The valve member 17 is connected by a link 20 to an intermediate point of a lever 21, one end of which lever is connected by a link 22 to the inner gimbal ring of the gyroscope. The direction of flight of the aircraft is indicated by the arrow 44.

A servomotor 23 consisting of a piston and cylinder has the cylinder 24 connected to a pivotal mounting 25 and the piston 26 connected to a lever 27 carried on a fixed pivot 28 and controlling through a link 29 an elevator 47 movable about a pivot 48 on the aircraft.

A second servomotor 30 having the same volumetric displacement as the servomotor 23 has its cylinder 31 mounted on a fixed pivot 32 and its piston 33 connected to a lever 34 carried on a fixed pivot 35. This lever 34 is connected by a link 36 to a bomb sight 45 mounted on a pivot 46 so that it is adjustable according to variations in the attitude of the aircraft in pitch.

Each of the motors comprises two chambers 37, 38 for liquid at opposite sides of the piston and two opposite chambers of the motors are connected by means of a conduit 39. The chamber 37 of the motor 23 is connected to the port 16 of the valve controller and the chamber 38 of the motor 30 is connected to the port 15 of the valve controller.

The piston 17 of the valve controller is actuated in accordance with relative pitch displacements of the gyroscope and according to the direction of the movement places the port 19 to which liquid pressure for instance is applied into communication with either of the distribution ports 15 or 16. Thus, assuming that the distribution port 15 is placed in communication with the liquid pressure supply the piston 33 of the servomotor 30 is moved to the left to operate the bomb sight through the lever 34 and link 36. Simultaneously, liquid is displaced from the servomotor 30 by way of the conduit 39 to the chamber 38 of the servomotor 23 to produce a like movement of the piston 26 of the servo-motor to actuate the elevators of the aircraft through the lever 27 and link 29 in the sense to stabilise the aircraft in pitch. A reverse movement of the servomotors is obtained by actuation of the valve controller to place the distribution port 16 in communication with the supply port 19.

A follow-up connection is provided by means of an extension 40 of the lever 34 pivoted to the lever 21 to which the movable member of the valve controller is connected. A restricted by-pass 41 is connected across the chambers 37 and 38 of the servomotor 30 and the lever 34 is provided with centering springs 42. Thus, for any position which the servomotor piston 26 is required to have in order to trim the aircraft in pitch, a slow transfer of liquid through the by-pass 41 will eventually lead to the piston 33 of the servomotor 30 being returned to a mean position by the action of the springs 42 until the loads on these springs are balanced. In this way, the pivots at the opposite ends of the lever 21 are returned to their datum positions corresponding to the datum position of the gyroscope 10. Preferably, one or both of the springs 42 are provided with adjustable connections 43 for adjustment of the stabilised attitude of the bomb sight in pitch.

The invention is not restricted to the specific embodiment hereinbefore described; for example instead of controlling the aircraft in pitch and the bomb sight according to the attitude of the craft in pitch, the system may be arranged to control the attitude of the craft in roll or in azimuth and to control the bomb sight accordingly. The invention is also capable of other applications. There may be more than two servomotors connected in series with one another and with the distribution ports of the simple control valve for simultaneous operation of these motors and furthermore, one such motor may be provided adjacent the valve controller solely for the purpose of providing the required follow-up.

I claim:

1. In an aircraft having means such as a gyroscope for detecting changes in the attitude of the aircraft about any axis, means for varying the attitude of the aircraft about this axis, and a bomb sight adjustable for variations in the said attitude of the aircraft, the combination of a double-acting fluid-actuated servomotor having two chambers for liquid and a relatively movable member actuated in the opposed sense by pressure of liquid in the two chambers, means for applying relative movement of said member and said chambers to adjust said attitude varying means, a second double-acting liquid-actuated motor having two chambers for liquid and a relatively movable member actuated in the opposed sense by the pressure of liquid in the two chambers, means for applying relative movement of said second mentioned member and chambers to adjust said bomb sight, a valve controller operated by said detecting means, said valve controller having two distribution ports, a liquid passage connecting one of said ports with one of the chambers of the first said motor, a liquid passage connecting the other of said distribution ports to one of the chambers of the second said motor, a liquid passage connecting the other chamber of the first motor with the other chamber of the second motor, whereby said servomotors are actuated in series by the valve controller, and a follow-up connection between one of said motors and said valve controller.

2. In an aircraft having means such as a gyroscope for detecting changes in the attitude of the aircraft about any axis, means for varying the attitude of the aircraft about this axis, and a bomb sight adjustable for variations in the said attitude of the aircraft, the combination of a double-acting fluid-actuated servomotor having two chambers for liquid and a relatively movable member actuated in the opposed sense by pressure of liquid in the two chambers, means for applying relative movement of said member and said chambers to adjust said attitude varying means, a second double-acting liquid-actuated motor having two chambers for liquid and a relatively movable member actuated in the opposed sense by the pressure of liquid in the two chambers, means for applying relative movement of said second mentioned member and chambers to adjust said bomb sight, a valve controller operated by said detecting means, said valve controller having two distribution ports, a liquid passage connecting one of said ports with one of the chambers of the first said motor, a liquid passage connecting the other of said distribution ports to one of the chambers of the second said motor, a liquid passage connecting the other chamber of the first motor with the other chamber of the second motor, whereby said servomotors are actuated in series by the valve controller, a follow-up connection between the second said motor and said valve controller, a by-pass conduit having a restricted passage connecting the chambers of the second said motor and spring means biasing the movable member of the second said motor to a mean position.

FREDERICK WILLIAM MEREDITH.